United States Patent
Pierce Jones

(10) Patent No.: US 8,261,494 B2
(45) Date of Patent: Sep. 11, 2012

(54) FLOOR AND ELECTRICAL GENERATOR MODULE

(75) Inventor: David Pierce Jones, Geneva (CH)

(73) Assignee: Squid, Inc., Geneva (CH)

( * ) Notice: Subject to any disclaimer, the term of this patent is extended or adjusted under 35 U.S.C. 154(b) by 0 days.

(21) Appl. No.: 12/747,020

(22) PCT Filed: Nov. 26, 2008

(86) PCT No.: PCT/GB2008/003938
§ 371 (c)(1),
(2), (4) Date: Jun. 9, 2010

(87) PCT Pub. No.: WO2009/074769
PCT Pub. Date: Jun. 18, 2009

(65) Prior Publication Data
US 2010/0263296 A1    Oct. 21, 2010

(30) Foreign Application Priority Data
Dec. 10, 2007   (GB) .................................. 0724101.1

(51) Int. Cl.
*H01L 31/042*   (2006.01)
*E04B 5/00*     (2006.01)

(52) U.S. Cl. ............. 52/69; 52/173.3; 136/244; 136/245

(58) Field of Classification Search ................. 52/173.3, 52/69; 136/244, 245; 165/48.2
See application file for complete search history.

(56) References Cited

U.S. PATENT DOCUMENTS

| | | | |
|---|---|---|---|
| 4,144,931 A * | 3/1979 | Medico, Jr. ................. | 165/48.2 |
| 6,046,399 A | 4/2000 | Kapner | |
| 6,606,823 B1 | 8/2003 | McDonough et al. | |
| 6,928,775 B2 * | 8/2005 | Banister ....................... | 52/173.3 |
| 6,948,443 B1 | 9/2005 | Kopylov | |
| 7,703,246 B2 * | 4/2010 | Chang .......................... | 52/173.3 |
| 2003/0010372 A1 | 1/2003 | Dinwoodie | |
| 2005/0231157 A1 * | 10/2005 | Sanders et al. ................ | 320/109 |
| 2008/0006320 A1 * | 1/2008 | Magnussen Aas et al. ... | 136/246 |
| 2008/0040990 A1 * | 2/2008 | Vendig et al. ................ | 52/173.3 |
| 2009/0120016 A1 * | 5/2009 | Hon ............................. | 52/173.3 |
| 2010/0095609 A1 * | 4/2010 | Kim ............................. | 52/173.3 |
| 2010/0229919 A1 * | 9/2010 | Benatar ........................ | 136/246 |
| 2010/0269446 A1 * | 10/2010 | Merrifield ...................... | 52/646 |
| 2011/0023867 A1 * | 2/2011 | Muchow et al. .............. | 126/623 |

FOREIGN PATENT DOCUMENTS

| | | | |
|---|---|---|---|
| AT | EP0372371 A1 * | 11/1989 | |
| DE | 4136379 A1 | 7/1992 | |
| DE | 19750540 A1 | 5/1999 | |
| GB | 2202254 A | 9/1988 | |
| IT | 1245790 B | 10/1994 | |
| WO | 02/101839 A1 | 12/2002 | |
| WO | 2007/039732 A2 | 4/2007 | |

* cited by examiner

*Primary Examiner* — Robert Canfield

(74) *Attorney, Agent, or Firm* — Raymond R. Ferrera; Adams and Reese LLP

(57) ABSTRACT

The present invention relates to a flooring module for forming a floor, and which also incorporates a photovoltaic cell for generating electricity. The floor and electrical generator module has a body comprising: a floor surface for forming a floor; and at least one photovoltaic cell; the module further comprising a support means supporting the body and allowing movement of the body between first and second positions; wherein the module is configured such that the body can function either as a floor in the first position when the floor surface is uppermost or as an electrical generator in the second position when the photovoltaic cell is uppermost.

20 Claims, 4 Drawing Sheets

FLOOR AND ELECTRICAL GENERATOR MODULE

The present invention relates to a flooring module for forming a floor, and which also incorporates a photovoltaic cell for generating electricity.

Flooring incorporating a photovoltaic cell (also termed a solar cell) is known, for example from EP 0,825,104. This document discloses solar cells laid horizontally, and covered with a transparent wear-resistant covering layer suitable for people to walk on. This arrangement has the disadvantage that the solar panels face directly upwardly, and so the effective surface area of the solar panels facing the sun is reduced when the sun is not directly overhead. Additionally, the covering material may reduce the sunlight reaching the solar panel, reducing the amount of electricity which can be generated. The covering material needs to allow light through, and so its ability to act as a support, be durable and to be attractive is compromised by this function.

The present invention provides a floor and electrical generator module, the module having a body comprising:
 a floor surface for forming a floor; and
 at least one photovoltaic cell;
 the module further comprising a support means supporting the body and allowing movement of the body between first and second positions;
 wherein the module is configured such that the body can function either as a floor in the first position when the floor surface is uppermost or as an electrical generator in the second position when the photovoltaic cell is uppermost.

Thus, the flooring module provides a floor which is suitable for people to walk on. The flooring module alternately allows a photovoltaic cell to be orientated to face in the general direction of the sun, and not be covered with a protective layer which may reduce the light incident on the photovoltaic cells.

The present invention will now be described, by way of example only, with reference to the accompanying drawings, in which.

Figure 1:
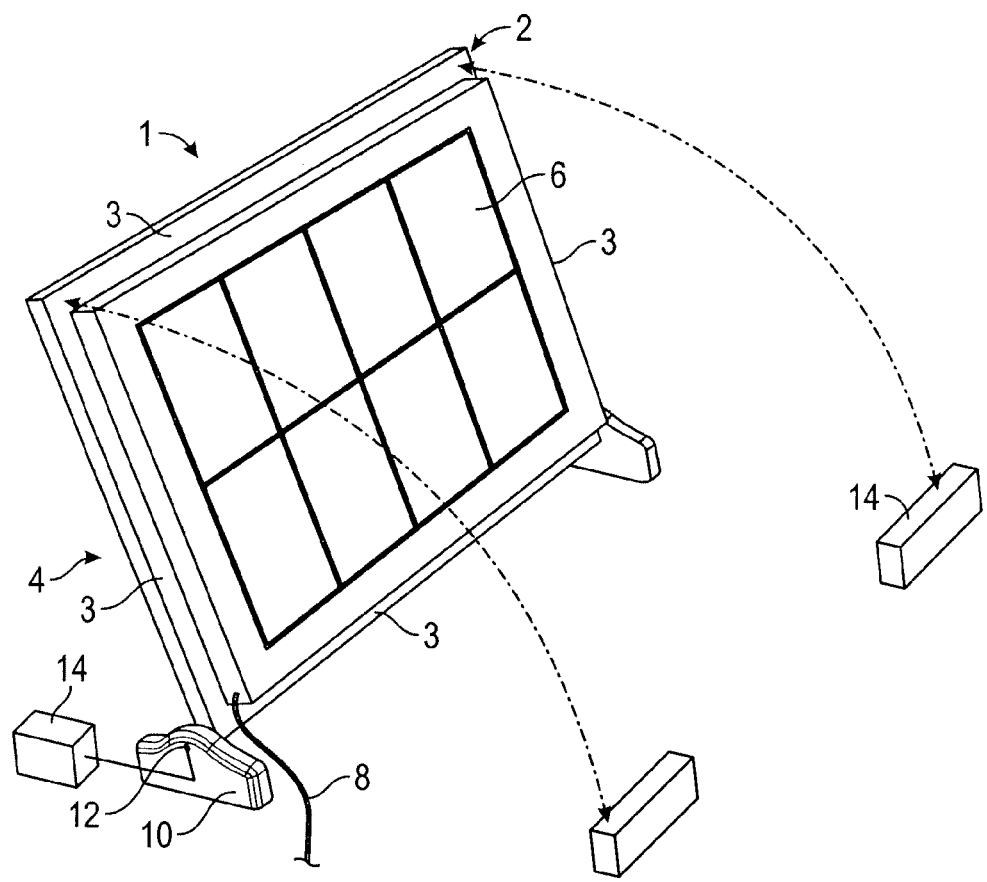
FIG. 1 is a perspective view of a first aspect of the present invention.

FIG. 1 shows a floor and electrical generator module 1 having a moveable body 2. The body 2 comprises a floor panel 3 and a photovoltaic cell (or solar cell) 6 mounted on the floor panel 3. The floor panel is in the form of a flat plate i.e. the panel is laminar. The floor panel 3 defines a floor surface 4 on its large surface opposite to the solar cell 6. The solar cell 6 can be mounted to the floor panel 3 by any conventional means, for example by screws or bolts. The term "photovoltaic cell" or "solar cell" should be taken to include a single cell or an assembly of any number of cells.

The solar cell 6 may be of any known type, and in particular is a type made from a silicon wafer. The solar cell 6 can generate electricity when light is incident on it. Preferably, the solar cell is sealed in a protective frame having a backing, which assembly can be termed a solar panel. The solar panel is attached to the floor panel.

Electrical energy generated by the solar cell 6 is distributed by a cable 8 which can be connected to an electrical load (e.g. an air conditioner, a light or a battery). The cables from each of the modules supplying electricity may be joined at a hub, such that the output of the module assembly is in the form of a single cable. The cables 8 preferably extends below the level of the floor surface 4 when the body 2 is in the first position.

The body 2 is mounted on support means, which allow movement of the body and also support the body in the required positions. The support means may comprise brackets 10 which are preferably located either end of the body 2. The body 2 is rotatably attached to each bracket 10 by a hinge 12. Alternatively, the body 2 can be connected to the brackets 10 by a linkage mechanism (not shown) which allows rotation of the body, and may also provide for linear movement of the body 2.

The support means allows movement of the body into a first position in which the floor surface 4 of the body 2 is uppermost. The floor surface 4 is substantially horizontal in this fist position. The body 2 may be supported in the first position by one or more stops 14 spaced apart from the support means. The stops 14 contact the underside of the floor panel. The solar cell 6 therefore does not bear any weight when the module is used as a floor. In this first position, the flooring module forms a horizontal floor, suitable for people to walk on. The floor panel is independent of the function of the cells. Therefore, the floor panel can be formed of any material, can be made durable, aesthetically attractive and can be made to fulfil any structural strength requirements. The floor panel also provides physical protection to the solar cells 6.

The body 2 can be moved manually (i.e. by hand) between the first and second positions. The support means may allow free movement between the first and second positions, and only prevent or restrict movement when the body has reached the first and second positions.

The floor panel 3 may take the form of any substantially planar panel. In particular, the panel 3 may be in the form of parallel strips of wood joined together, known as decking. Alternatively, the floor panel may be made of, or covered by, tiles.

The support means allows movement of the body 2 into a second position, which is shown in FIG. 1. Preferably, the support means provides for rotation of the body 2 between the first and second positions. In the second position, the solar panel is uppermost and operable to receive incident light and generate electricity. The solar panel 6 is preferably at an angle between horizontal and vertical, i.e. at an angle to the horizontal. The angle of the second position may be chosen for a particular latitude and/or a particular situation of installation to optimise the incident light. The solar panel preferably faces south if installed in the northern hemisphere or north if installed in the southern hemisphere, in order to generally face towards the sun for a large part of the day. Alternatively, the solar panel 6 may be orientated to face directly upwardly, i.e. extend horizontally in the second position.

The body 2 may be moved between the first and second positions manually, the support means holding the body 2 in the first and second position.

In an alternate embodiment, the support means may support the body in one of two second positions in which the solar cell 6 is deployed and operable. In a first deployed position, the solar cell 6 may be angled at a first angle to the horizontal appropriate for the position of the sun in summer. In a second deployed position, the solar cell 6 may be at a second angle to the horizontal appropriate for the position of the sun in winter. The first angle to the horizontal will be greater than the second angle, since the sun is generally higher in the sky in summer.

The module 1 may comprise an operating means for automatically controlling the movement of the body 2. The operating means may automatically move the body 2 between the first and second positions. The operating means may comprise one or more electric motor and/or springs or other known mechanisms to effect movement.

The operating means may continuously adjust the angle of the body 2, to ensure that the solar cell 6 is at an angle matching the elevation of the sun. This may be achieved with a preset timer, or with a sensor to locate the position of the sun and adjust the angle of the solar cell 6 accordingly.

The operating means may comprise a timing means to move the body automatically from the first position to the second position at a first predetermined time, and from the second position to the first position at a second predetermined time. The first and second times could coincide approximately with dawn and dusk respectively.

The operating means may comprise a light sensor generating a signal indicating the light intensity incident on the module 1. The operating means may be configured to automatically move the body from the first position to the second position in response to a signal from the light sensor indicating that light of an intensity greater than a predetermined value could be incident on the solar cell 6. This would mean that the solar cell 6 would be automatically deployed when there is a sufficient intensity of light to make power generation worthwhile. In addition, the operating means may automatically move the body from the second position to the first position in response to a signal from light sensor indicating that light of an intensity less than a predetermined value is incident on the solar cell 6. This would mean that when there is insufficient light incident on the solar cell to make power generation worthwhile, the body 2 is moved into the first position to form a floor, and protect the solar cell 6 from damage.

The operating means may comprise a wind speed sensor which detects the speed of wind in the vicinity of the module 1. If the wind speed sensor detects a wind speed greater than a predetermined value, the operating means automatically moves the body from the second position to the first position. In the first position, the solar cell is protected from flying debris, and loads on the hinges 12, due to high wind speeds are reduced.

Figure 2:
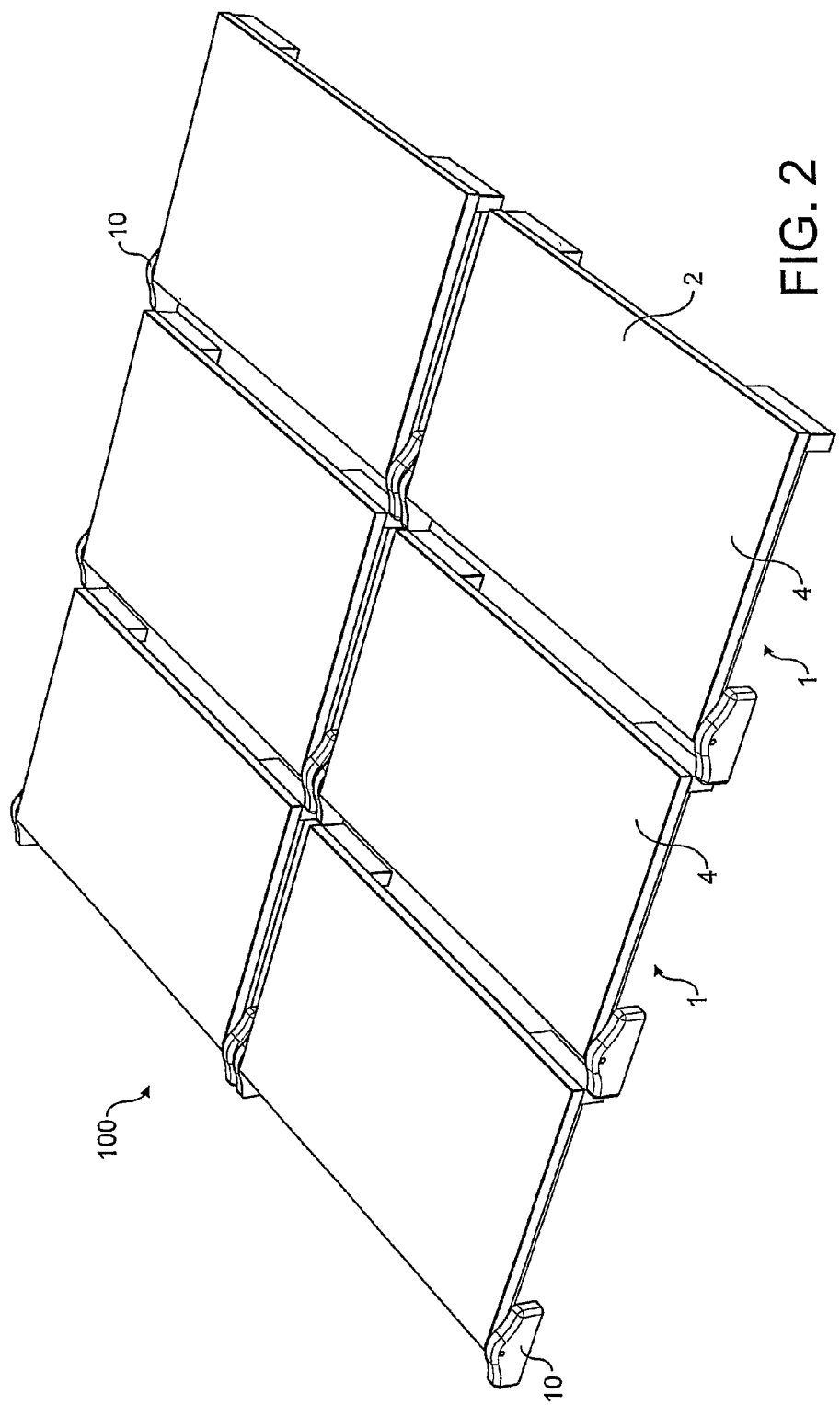
FIG. 2 is a perspective view of a second aspect of the present invention.
Figure 3:
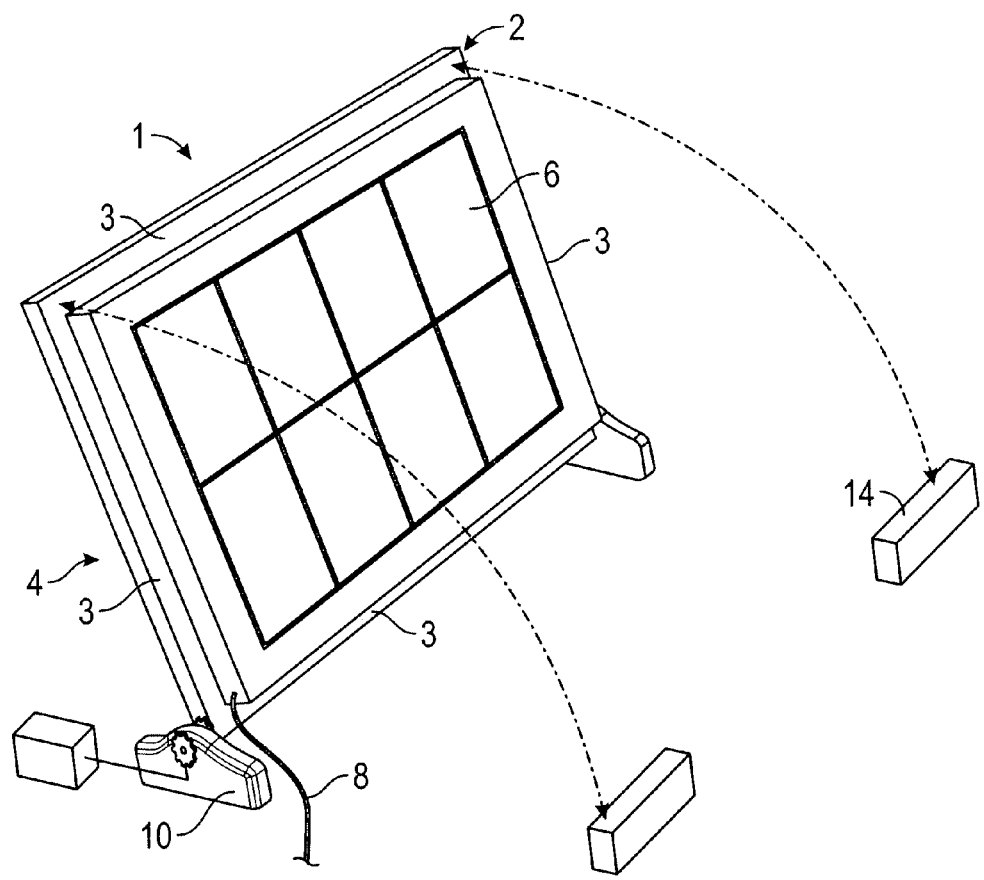
Figure 4:
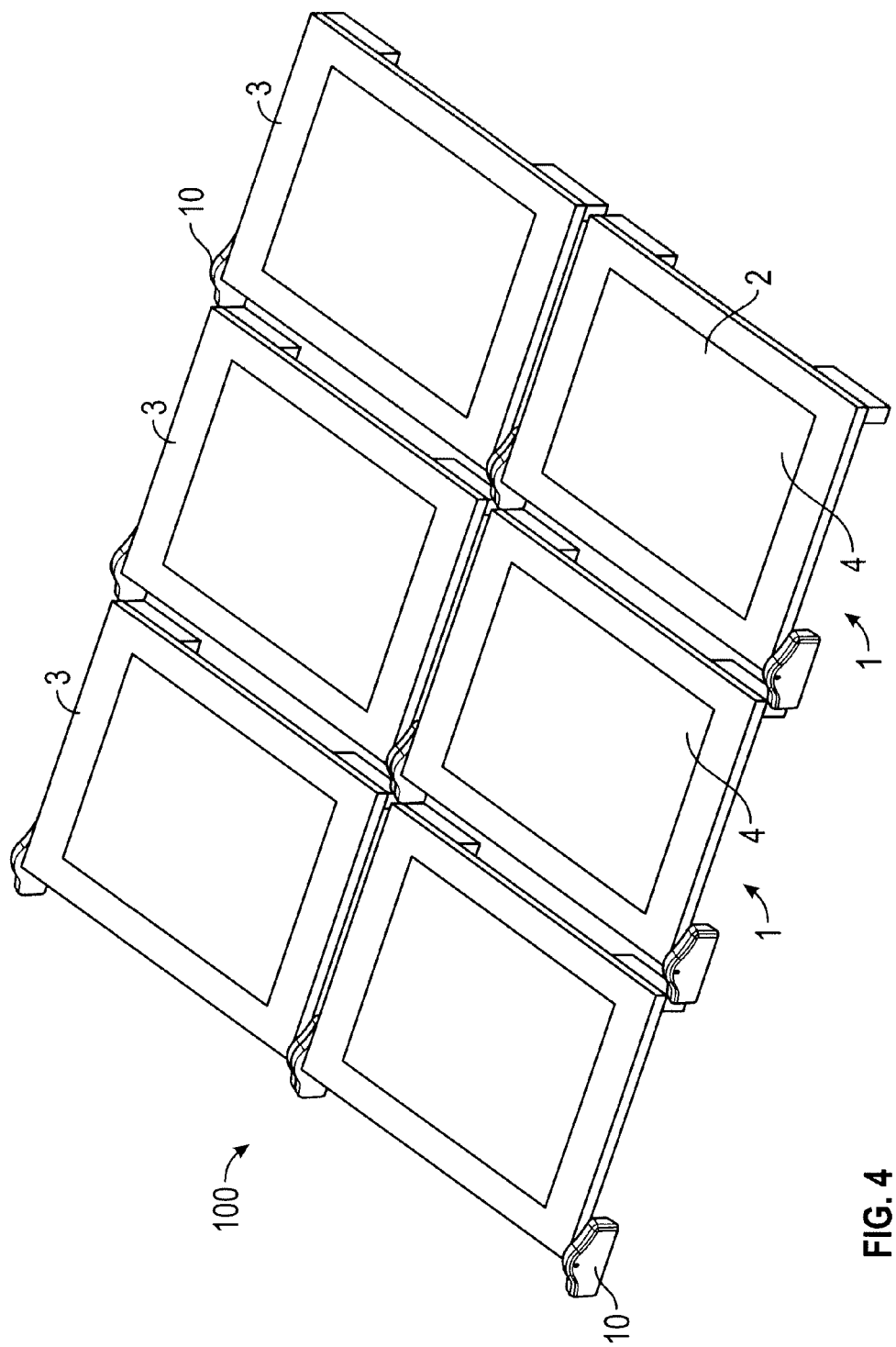

FIG. 2 shows a floor and electrical generator module assembly comprising a plurality of modules 1 as described above. The floor and electrical generator module assembly shown has six of the above described modules 1, although the assembly may comprise more or fewer modules 1 that this. Each of the modules 1 may be opened simultaneously by an operating means as described above. This ensures that there are no clashes between the modules 1 during opening or closing. Alternatively, each flooring module may be spaced apart from another by a section of permanent flooring in order to prevent clashes during opening or closing. Each of the modules in the flooring module assembly may alternatively be manually opened or opened automatically in a pre-defined sequence by the operating means.

The cables from each of the modules supplying electricity may be joined at a hub, such that the output of the module assembly is in the form of a single cable. The cables 8 preferably extends below the level of the floor surface 4 when the body 2 is in the first position.

The body 2 may not comprise a separate floor panel as such. Instead, the body 2 may only comprise a solar cell, in which one or more cells are sealed in a frame having a backing. Such an arrangement is known as a solar panel. The backing of the solar panel may be sufficiently strong to itself form the floor surface 4 on which people may walk. The frame of the solar panel would be connected to the brackets 10.

The solar cell 6 has been described as a photovoltaic cell for generating electricity. Alternatively, the solar panel may be a solar thermal collector to collect and provide heat from the sun or a solar hot water panel for heating water.

The invention claimed is:

1. A floor and electrical generator module, the module having a body comprising:

a planar floor panel defining a first surface of the body for forming a floor; and at least one photovoltaic cell providing a second surface of the body which faces in a direction opposite to the first surface;

the module further comprising a support means supporting the body and allowing movement of the body between first and second positions;

wherein the module is configured such that the body can function either as a floor in the first position when the floor surface is uppermost or as an electrical generator in the second position when the photovoltaic cell is uppermost.

2. The module of claim 1 wherein the planar floor panel is a backing of a solar panel which comprises the photovoltaic cell.

3. The module as claimed in claim 1 wherein in the first position the floor surface is substantially horizontal, and in the second position the support means supports the body such that the photovoltaic cell faces upwardly and at an angle between a horizontal and a vertical plane.

4. The module as claimed in claim 1 wherein the support means allows rotation of the body between the first and second positions.

5. The module as claimed in claim 1 wherein the support means comprises at least one hinge or at least one linkage mechanism.

6. The module as claimed in claim 1 further comprising at least one stop for contacting the body in the first position, and bearing at least some of the weight of the body and load on the body in the first position.

7. The module as claimed in claim 1 wherein the body comprises a planar floor panel has the first side defining the floor surface; and the photovoltaic cell is mounted on the floor panel, on a second side of the floor panel opposite to the first side.

8. The module as claimed in claim 6 wherein the at least one stop contacts the floor panel on the side of the photovoltaic cell, the at least one stop configured such that the photovoltaic cell does not bear any weight when the module is in the first position.

9. The module as claimed in claim 1 wherein the support means can support the body in a second position in which the photovoltaic cell is at a first angle to the horizontal optimised for the position of the sun in the summer; and the support means is operable to support the body in an alternative second position in which the photovoltaic cell is at a second angle to the horizontal optimised for the position of the sun in winter.

10. The module as claimed in claim 1 wherein a cable connects the photovoltaic cell to a load for supplying electrical energy generated by the photovoltaic cell, the cable extending below the level of the floor surface when the body is in the first position.

11. The module as claimed in claim 1 wherein the module is moved manually between the first and second positions, the support means resisting movement of the body only in the first and second positions, and allowing free movement between the first and second positions.

12. The module as claimed in claim 1 comprising an operating means coupled to the body to move the body between the first and second positions.

13. The module as claimed in claim 12 wherein the operating means automatically moves the body from the first position to the second position at a first predetermined time, and automatically moves the body from the second position to the first position at a second predetermined time.

14. The module as claimed in claim 1 wherein the operating means is operable to continuously adjust the angle of the photovoltaic cell to the horizontal to substantially track the elevation of the sun over at least part of the day.

15. The module as claimed in claim 12 wherein the operating means can automatically move the body from the first position to the second position in response to a signal from a light sensor indicating the presence of light of an intensity greater than a predetermined value.

16. The module as claimed in claim 12 wherein the operating means can automatically move the body from the second position to the first position in response to a signal from light sensor indicating the presence of light of an intensity less than a predetermined value.

17. The module as claimed in claim 12 wherein the operating means can automatically move the body from the second position to the first position in response to a signal from a wind speed sensor indicating that wind of a speed greater than a predetermined value is incident on the body.

18. A floor and electrical generator module assembly comprising a plurality of modules as claimed in claim 1, wherein in the first position the modules form a continuous floor.

19. The module assembly as claimed in claim 18 comprising operating means to automatically and simultaneously move the body of each of the modules between the first and second positions.

20. The module assembly as claimed in claim 18 wherein each module is directly adjacent another module to form a floor.

* * * * *